United States Patent [19]

Fujii et al.

[11] 4,300,047
[45] Nov. 10, 1981

[54] METHOD AND APPARATUS FOR DETECTING INFRARED RAYS AND CONVERTING INFRARED RAYS TO VISIBLE RAYS

[75] Inventors: Masaharu Fujii, Tokyo; Kenichi Nakamura, Iwaki, both of Japan

[73] Assignees: Kureha Kagaku Kogyo Kabushiki Kaisha; Aska Electrons Co., both of Tokyo, Japan

[21] Appl. No.: 125,987

[22] Filed: Feb. 29, 1980

[30] Foreign Application Priority Data

Mar. 12, 1979 [JP] Japan ................................. 54-28350
Mar. 12, 1979 [JP] Japan ................................. 54-28351

[51] Int. Cl.³ .......................... H01J 31/49; G01J 1/00
[52] U.S. Cl. ................................... 250/330; 250/338
[58] Field of Search ............... 250/330, 332, 334, 338, 250/340, 342, 486, 487

[56] References Cited

U.S. PATENT DOCUMENTS

| | | | |
|---|---|---|---|
| 3,014,147 | 12/1961 | Morton | 250/330 |
| 3,707,695 | 12/1972 | Yamaka | 250/338 |
| 3,848,245 | 11/1974 | Marshall | 250/330 |
| 3,898,461 | 8/1975 | Boot | 250/338 |
| 4,032,783 | 6/1977 | Koda | 250/338 |

*Primary Examiner*—Alfred E. Smith
*Assistant Examiner*—Janice A. Howell
*Attorney, Agent, or Firm*—Wegner & Bretschneider

[57] ABSTRACT

The method and apparatus for measuring the intensity of the infrared rays and simultaneously converting the infrared rays to the visible rays is developed by using the pyroelectric substance and the fluorescent substance capable of presenting extinction of luminescence respectively.

15 Claims, 8 Drawing Figures

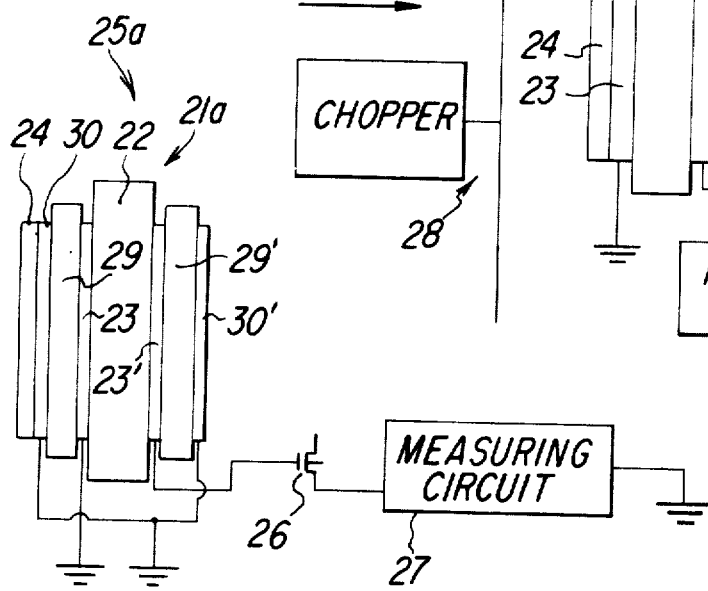
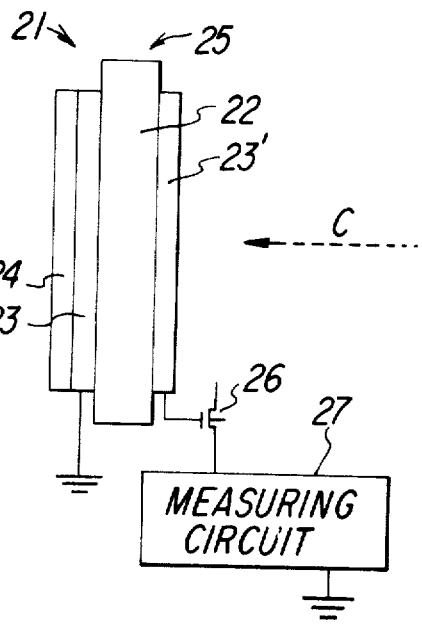
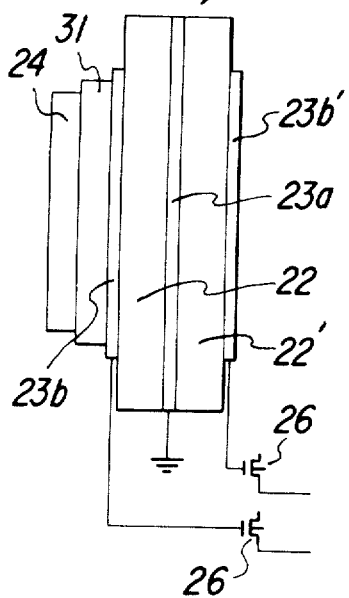
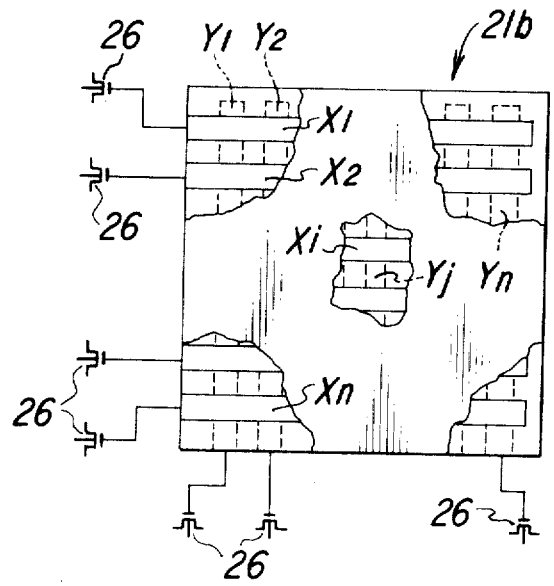

METHOD AND APPARATUS FOR DETECTING INFRARED RAYS AND CONVERTING INFRARED RAYS TO VISIBLE RAYS

This invention concerns a method and apparatus for measuring the intensity of infrared rays by using a pyroelectric element having a thin pyroelectric layer and simultaneously visualizing the infrared rays.

It is possible to identify the oscillation modes of infrared lasers by visualizing infrared laser beam and many useful information can be obtained as well by the detection of the oscillation outputs of the lasers.

For visualizing infrared laser beam and identifying the oscillation modes, a method is known using such a fluorescent or phosphorescent substance that presents conspicuous extinction of luminescence, in which the after glow emitted from the substance by the initial stimulation with ultraviolet rays or the like turns brighter or darker or, depending on the case, shows luminescence of different color from that of the after glow at the portions irradiated subsequently by infrared rays while the after glow is still present. The substances that present extinction of luminescence by infrared rays are hereinafter generally referred to as infrared fluorescent substance. The infrared fluorescent substance includes, for example, zinc sulfide fluorescent substance consisting of zinc sulfide (ZnS) as a host material and copper, silver or lead incorporated thereto as a heavy metal activator. Other infrared fluorescent substances such as Tl-activated SrSe and Eu-activated CdS are also used. Near ultraviolet rays, cathode rays, X-rays, α-rays, β-rays or the likes are used for the initial excitation of the fluorescent substance.

Particularly, by the use of such infrared fluorescent substance, for example, containing Cu-activated ZnS as a main ingredient that show the quenching i.e., rapid quenching of fluorescence upon irradiation of infrared rays while the fluorescence is present, negative photographic films can be observed in a positive manner.

An infrared ray power meter or infrared detector is employed in this case for measuring the intensity of the irradiated infrared rays. Conventional infrared power meters include thermocouples, Golay cell, bolometer, pyroelectric detector, photoconductive detector, photovoltaic detector and photoelectromagnetic detector. In the use of these conventional infrared power meters, however, disadvantages are present in that simultaneous detection for the oscillation modes of the infrared laser beam and positive observation of negative type photographic films mentioned before are difficult since infrared rays can not pass through these detectors, as well as, in that it is laborious to situate the power meter at an exact position on the optical path of the infrared rays since the rays are invisible.

Although the infrared power meter is not necessarily transparent if it is situated behind the infrared fluorescent substance, it is required then for the infrared ray power meter that it has about the same wide area as that of the infrared fluorescent substance since the power meter measures, in this case, the intensity of the rays scattered through the infrared fluorescent substance.

However, it is difficult to provide a wide detection area for conventional infrared power meters. Even if an infrared detector with a wide detection area can be obtained, theoretically, as in photoconductive detectors, most of the photoconductive detectors require a thermostat for low temperature, which is necessarily great in size for such a wide area and brings about much disadvantage in view of cost.

The inventors have made an earnest study on a method and an apparatus for visualizing received infrared rays by using extinction phenomena of an infrared fluorescent substance and simultaneously measuring the intensity and/or the intensity distribution of the infrared rays and, as the result, have accomplished the method and the apparatus according to this invention.

The object of this invention is to measure the intensity of received infrared rays and simultaneously visualizing such infrared rays. For attaining the object, according to this invention, a method comprises a step of measuring the intensity of the infrared rays or the intensity distribution of the images formed by the infrared rays by using a pyroelectric element having a thin pyroelectric layer and a step of simultaneously visualizing the infrared ray images by using a substance exhibiting extinction of luminescence. The apparatus for detecting and visualizing the infrared rays according to this invention for attaining the object comprises an infrared detector using a pyroelectric element having a thin pyroelectric layer and an infrared ray visualizing mechanism having a layer substance exhibiting extinction of luminescence, said mechanism being located on the same optical path of the infrared rays as that for the pyroelectric element.

Another object of this invention is to provide an apparatus for measuring the intensity of the infrared rays and visualizing the infrared rays in a relatively small size and with a relatively high sensitivity. For attaining said another object, the pyroelectric element in the infrared ray detecting and visualizing apparatus according to this invention comprises at least one layer of pyroelectric film and electrode layers provided on both sides thereof.

A further object of this invention is to measure the intensity distribution of the infrared ray and simultaneously visualizing such infrared rays. For attaining the above object, one of the electrode layers of the pyroelectric element in the apparatus of this invention comprises a plurality of spots or one group of conductor bands insulated from each other, said pyroelectric element has an another pyroelectric layer, one face of said another pyroelectric layer being located on an another electrode layer of said pyroelectric element, said another pyroelectric layer having still another electrode layer on an another face thereof, said still another electrode layer comprising an another group of conductor bands insulated from each other and extending in the direction crossing to said one group of conductor bands.

A still further object of this invention is to provide an apparatus capable of measuring the intensity or changes in the intensity of the infrared rays with a relatively high sensitivity, as well as of visualizing the infrared rays. For attaining the above object, according to this invention, a light chopper is provided for intermittently giving infrared rays to the pyroelectric element and the substance layer. In order to attain said still further object, the pyroelectric element is transparent or semitransparent to the infrared rays in the apparatus according to this invention.

A still further object of this invention is to provide an apparatus for measuring the intensity of the infrared rays and visualizing such infrared rays which is small in size and can be operated stably for a long time, as well as a composite element for use with the apparatus. For attaining this object, according to this invention, the substance layer is integrally provided on one face of the pyroelectric element either directly or indirectly.

This invention is to be described in more details referring to the accompanying drawings, by which the foregoing and other objects, as well as the features of this invention will be made clearer in which:

FIG. 5 is an explanatory plan view of an apparatus for detecting and visualizing infrared rays using the composite element of the first embodiment of this invention;

FIG. 6 is an explanatory side view of the composite element of the second embodiment according to this invention;

FIG. 7 is an explanatory side view of the composite element of the third embodiment according to this invention, and FIG. 8 is an explanatory partially broken plan view of another embodiment of the electrode to be applied to the apparatus according to this invention.

Figure 1:
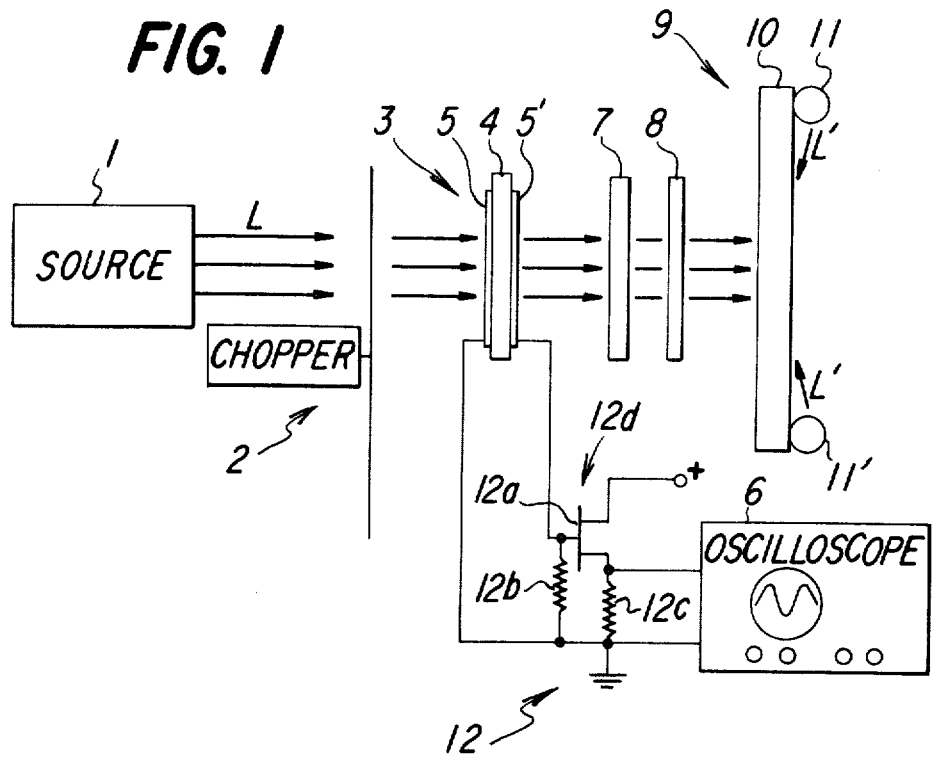
FIG. 1 is an explanatory plan view of an apparatus for detecting and visualizing infrared rays of a first embodiment according to this invention.

FIG. 1 shows a light source 1, a light chopper 2, a pyroelectric element 3 having a pyroelectric layer 4 attached with electrodes 5, 5' on both surfaces thereof, a silicon plate 7, a negative photographic film 8, an infrared ray visualizer 9 having an infrared fluorescent substance plate 10 and ultraviolet lamps 11, 11', and a detection circuit 12 having an oscilloscope 6, an amplifier 12d and the like.

In the shown apparatus, substantially parallel white rays containing infrared rays emitted from the source 1 are chopped by the chopper 2 (for example, at the 20 Hz of chopping frequency) and wave packet of infrared rays reaches the pyroelectric element 3 behind the chopper 2 to generate heat in the pyroelectric element 3 thereby producing pyroelectricity therein. When amount of the surface charges produced in the pyroelectric element 3 is measured by the detection circuit 12, the intensity of the rays passing through the pyroelectric element 3 can be determined. The detection circuit 12 comprises an amplifier circuit 12d having a transistor 12a, resistors 12b, 12c and an oscilloscope 6. While on the other hand, the rays passed through the pyroelectric element 3 are converted only to infrared rays after passing through the silicon plate 7 and then passes through the negative photographic film 8 to obtain images. When the images are projected on the infrared ray visualizer 9, positive images can be observed.

In the drawing, an arrow L denotes the optical path of the rays to be detected and an arrow L' denotes ultraviolet rays given from the lamps 11, 11' for initially activating the fluorescent plate 10.

The pyroelectric layer 4 used in the pyroelectric element 3 consists, for example, of a transparent polyvinylidene fluoride (PVDF) film of 8 μ thickness having pyroelectric ratio at 23° C. of: $dPs/dT = 4 \times 10^{-9}$ $C/cm^2 \cdot deg$. (T denotes temperature in degree and Ps denotes surface charge density in unit of $C/cm^2$), and nesa glass is provided as the electrodes 5, 5' on its both sides. The S/N ratio (signal to noise ratio) in the pyroelectric output voltage obtained from the detection circuit 12 in this case was about 30. If the PVDF pyroelectric film is completely sandwiched between nesa glass electrodes, piezoelectric noise voltage due to wind or the like and pyroelectric noise voltage due to slow changes in the atmospheric temperature can be eliminated.

The clearness of the positive images transferred to the infrared visualizer 9 had no substantial difference as compared with the case where pyroelectric element 3 was not present. Consequently, the intensity of the irradiated rays can be measured at a same time with no disadvantageous effects on the performance of the infrared ray visualizer by this method. Here, temperature increase of the element 3 is due to the absorption of infrared rays.

In carrying out the method of this invention, the ultraviolet lamps 11 for initially activating the fluorescent plate 10 can also be situated in front of the fluorescent plate 10. While the detection circuit 12 comprises the amplifier 12d and the oscilloscope 6 in this embodiment, the oscilloscope 6 can be replaced or used in combination with other instrument such as a voltmeter, or it may further be combined optionally with recording device, memory device or transmission device.

Figure 2:
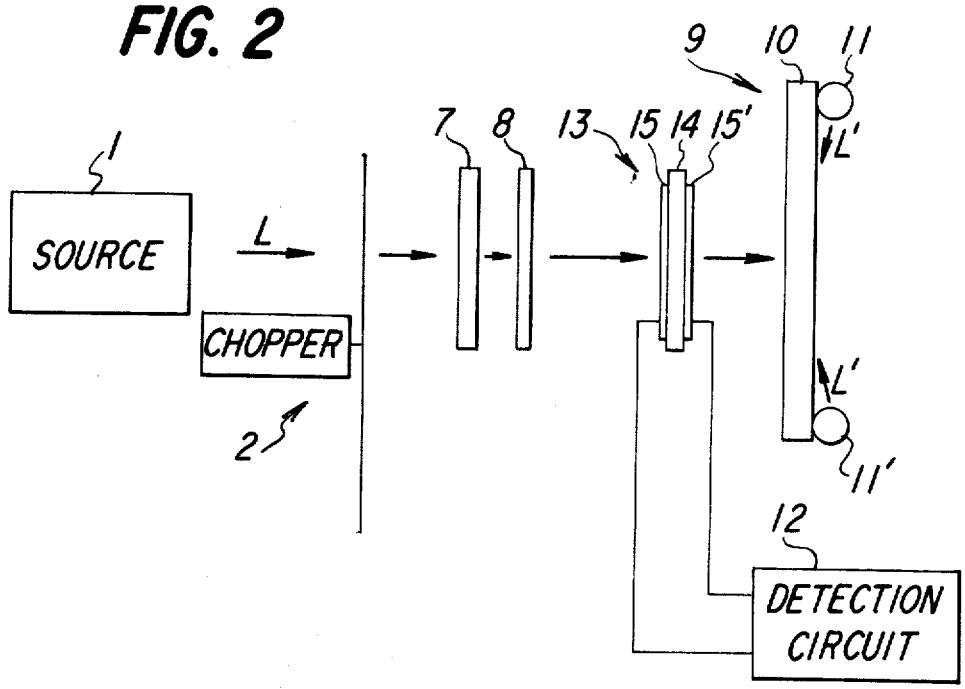
FIG. 2 is an explanatory plan view of an apparatus for detecting and visualizing infrared rays of a second embodiment according to this invention.

FIG. 2 shows a preferred embodiment of the apparatus for carrying out the method of this invention capable of simultaneously effecting the measurement of the intensity distribution of the rays passing through the negative photographic film 8 and negative-to-positive reversion of the images.

Figure 4:
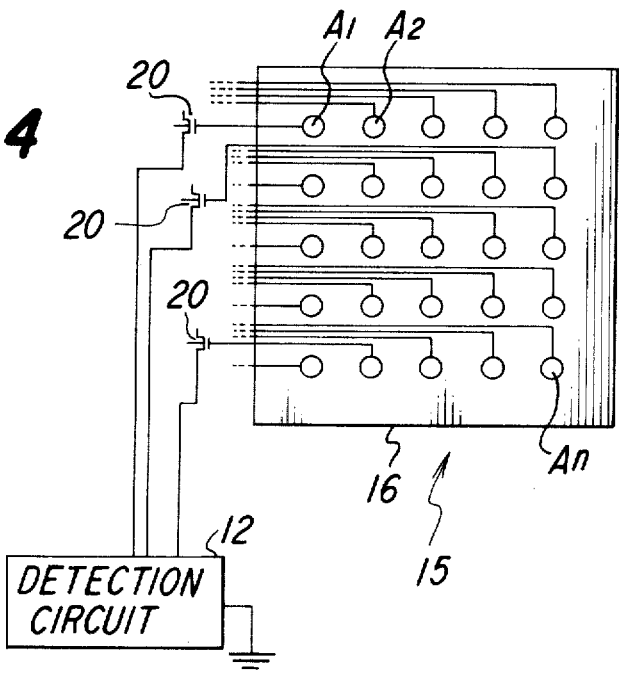
FIG. 4 is an explanatory plan view of one embodiment of the electrode to be applied to the apparatus of this invention.

In this embodiment, an electrode plate 15 provided on one face of a pyroelectric polymer film 14 comprises a plurality of spot matrix electrodes $A_1, A_2, \ldots, A_n$ prepared by vapor depositing nesa films on the surface of a transparent glass plate 16, for example, as shown in FIG. 4, and the other electrode 15' comprises spot matrix electrodes or continuous electrode prepared by vapor depositing nesa films at the positions at least facing to the above spot matrix electrode on one face. In the drawing, field effect transistors 20 are used for the impedance conversion. A pyroelectric element 13 comprising a pyroelectric polymer film 14 and the electrode plates 15, 15' is located between a negative film 8 and an infrared ray visualizer 9, and infrared ray images formed through the negative film 8 are transmitted through the pyroelectric element 13 and, thereafter, projected on the visualizer 9. Since charges due to pyroelectricity is produced on each of the spot matrix electrodes $A_1, A_2, \ldots, A_n$ on the electrode plates 15, 15' depending on the darkness of the images when the infrared rays pass through the pyroelectric element 13, the produced charges are separately led to the detection circuit 12 for the measurement of the intensity distribution of the images. In addition, by converting the intensity distribution of the infrared rays corresponding to the darkness distribution of the images into electrical signals, the converted data signals can be stored in a computer, or used in reproduction or transmission simultaneously with the visualization.

By using the pyroelectric element 3 with continuous electrodes on both sides as shown in FIG. 1 in place of the pyroelectric element 13, the areas for the positive and negative portions of the images can be calculated when the infrared rays irradiated to the film 8 and the element 3 (in place of the element 13 in FIG. 2) have uniform intensity distribution. Accordingly, graphic configurations such as of maps, statistical graphs and measured graphs for experimental values whose areas are to be measured can be visualized and simultaneously measured for their areas by using a photographic film taken from these graphic configurations entirely filled with a color, or using, in place of the film, a piece cut out from the base along the contour of the configuration or the base having a recess with corresponding configuration left after the cut out of the above piece.

While the pyroelectric element 3 or 13 is situated in front of the infrared visualizer 9 in the embodiments shown in FIG. 1 and FIG. 2, the relative position between them can be changed and the pyroelectric element 13 may be placed behind the infrared visualizer 9. Although the infrared rays are partially absorbed for the extinction in the plate 10 when they pass through the fluorescent plate 10 of the visualizer 9 in this case, the intensity or the intensity distribution of transmitted rays can be calculated with ease by previously measuring the reduction ratio in the intensity of infrared rays when the infrared rays pass through the plate 10 and providing a calibration curve based thereon.

Figure 3:
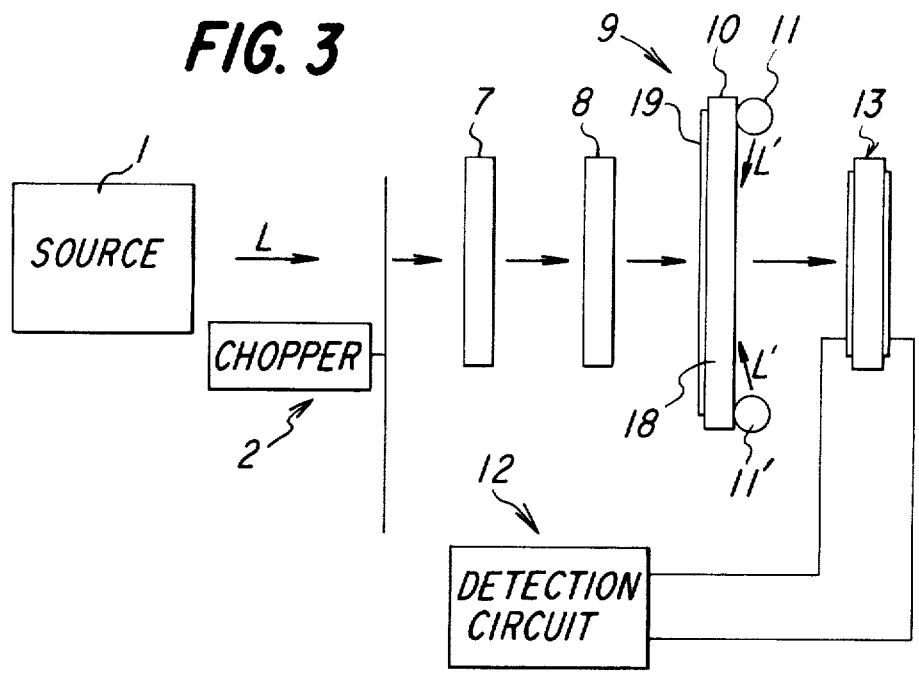
FIG. 3 is an explanatory plan view of an apparatus for detecting and visualizing infrared rays of a third embodiment according to this invention.

The fluorescent plate 10 used in this case is, for example, a transparent glass or plastic plate 18 coated on its one face with a fluorescent substance layer 19 capable of presenting extinction of luminescence as shown in FIG. 3. Although reduction in the intensity of the infrared ray upon passing through the fluorescent substance layer 19 can be calibrated to some extent, it is preferred to reduce the thickness of the fluorescent substance layer to minimum, so that absorption and scattering of the infrared rays may be limited as little as possible.

While explanation has been made in FIG. 1-FIG. 3, that the visualizer and the pyroelectric element are spatially separated, the infrared fluorescent film of the infrared visualizer and the pyroelectric element layer can be laminated directly or indirectly as an integral part.

In FIG. 5, a pyroelectric element layer 21 is composed, for example, of a pyroelectric layer 22 such as of a polyvinylidene fluoride film with pyroelectric property, and electrodes 23, 23' attached on both sides thereof. An infrared fluorescent substance layer 24 containing, for example ZnS as a main ingredient is uniformly coated on one surface of the pyroelectric element layer 21. The pyroelectric element layer 21 and the infrared fluorescent film 24 integrally forms a composite element 25. The electrode is connected to a voltage measuring circuit 27, for example, by way of a field effect transistor (FET) 26 for impedance conversion.

The composite element 25 emits fluorescence from the fluorescent film 24 upon irradiation of ultraviolet rays and the fluorescence disappears by the quenching of fluorescence upon further irradiation of infrared rays (for example, infrared images transmitted through a negative film) at the portion irradiated by the infrared rays. The incident direction of the ultraviolet rays and that of the infrared rays may be identical or different to each other. When the infrared rays are irradiated to the composite element 25, for example, from the side of the infrared fluorescent film 24 as shown by the arrow B in FIG. 5, part of the infrared rays are absorbed in the fluorescent film 24 for the quenching and, as the result, the fluorescent film is heated at the portion. The heat is directly transmitted to the surface of the pyroelectric element 21 to generate the surface charge according to the pyroelectricity. When each of the electrodes 23, 23' is attached on each entire surface of the pyroelectric layer 22 respectively, the area for which the infrared rays irradiated can be calculated based on the measurement for the amount of the pyroelectricity. Since the pyroelectricity is generated in a differential manner, that is, the pyroelectricity is generated corresponding to the thermal changes in the pyroelectric element, it is preferred to provide a light chopper (or shutter) 28 in front of the composite element 25 for the convenience of the measurement for such differential electrical quantity. When the electrode on one side comprises a plurality of spot-like electrodes $A_1, A_2, \ldots, A_n$ and wirings are made separately from each of the spot electrodes, for example, as shown in FIG. 4, the intensity distribution of the infrared rays can be measured based on the surface charge distribution according to the pyroelectricity generated in each of the spots.

Irradiation of the infrared rays on the side of the pyroelectric element (in the direction of an arrow C) causes no substantial difference to the case where the infrared rays are irradiated in the direction of the arrow B, excepting that the pyroelectricity is generated in the pyroelectric element at first by the effect of the infrared rays and the transmitted infrared rays quench the fluorescence. In this case chopper 28 is preferably situated on the side of the electrode 23'. While the foregoing explanation has been made as that all of the infrared rays are absorbed in the fluorescent layer 24 where the rays are irradiated from the direction B, when the fluorescent layer 24 is thin and the infrared rays partially pass through the layer 24, those portions of the infrared rays passed through the layer 24, of course, also serves to produce the pyroelectricity in the element 21.

The electrode may not be transparent when the infrared rays are irradiated from the direction B. It is, however, preferred when the rays are irradiated from the direction C, to use the electrode 23, 23' consisting for example, of tin oxide or a transparent or semi-transparent thin metal film prepared through vapor deposition, so that a sufficient portion of the infrared rays may be transmitted through the pyroelectric element layer 21 to exhibit quenching effect in the fluorescent layer 24.

FIG. 6 shows still another embodiment of this invention, in which a pyroelectric element 21a comprises a pyroelectric substance layer 22, electrode layers 23, 23', provided on its both sides, transparent or semi-transparent insulating layers 29, 29' and shield electrode layers 30, 30' provided respectively to the outer sides of the electrode layers, so that no noises are produced due to external potential. On one surface of the pyroelectric element 21a, is provided a coating layer of an infrared fluorescent substance 24, and they integrally form a composite element 25a. When the infrared rays are irradiated on the side of the fluoroscent layer 24, the heat produced in the fluorescent layer 24 has no substantial effects on the pyroelectricity and the intensity measurement depends on pyroelectricity caused in the element 21a by the infrared rays which have passed through the fluorescent substance. It will be apparent that the infrared rays can be irradiated also from the side of the pyroelectric element 21a as in FIG. 5.

FIG. 7 shows a further embodiment, in which a pyroelectric element 21b consists of two pyroelectric layers 22, 22' laminated to each other while sandwitching an intermediate electrode layer 23a and attached at their outer sides with electrode layers 23b, 23b' respectively. The electrode layers 23b, 23b' have, for example, parallel electrode groups $X_1, X_2, \ldots, X_n$ and $Y_1, Y_2, \ldots, Y_n$ respectively and the electrode layers 23b and 23b' are crossed to each other in viewing along the optical path as shown in FIG. 8. The electrode layer 23a is an integral electrode (generally a continuous electrode) provided on the back of the electrode layers 23b, 23b'. Usually, the electrode layer 23a is a grounded electrode and the electrode layers 23b, 23b' form row-and-column output electrodes, in which the coordinate of the pyroelectricity is recognized as the crossing point of electrodes $X_i$, $Y_j$ on arbitrary rows and columns. The element 21b is provied on its one side with an infrared fluorescent layer 24, for example, by way of a transparent insulating layer 31 and the element 21b is arranged as a composite element capable of visualizing the infrared rays, as well as measuring the intensity distribution of the infrared rays, for example, having a single extreme intensity value. The element is also effective for detecting the moving direction of infrared source. The pyroelectric element 21b may also be used in place of the pyroelectric elements 3, 13, 13' as shown in FIG. 1-FIG. 3.

The pyroelectric film available to the pyroelectric element is not restricted to the film of polyvinylidene fluoride but include those polymeric pyroelectric films obtained by polarizing the films of polymer or copolymer comprising vinyl fluoride, vinylidene fluoride, vinylidene chlorofluoride, vinyl chloride, vinylidene chloride, acrylonitrile, methylmethacrylate, and other polar monomer as a main ingredient, inorganic pyroelectric films such as of lead titanate, barium titanate, lead zirconate, lead titanium zirconate and the likes, as well as resin films containing pyroelectric powder. These pyroelectric films are preferably transparent or semi-transparent to the infrared rays when the pyroelectric element is located in front of the visualizer. They are not necessarily be transparent when situated behind the visualizer as in the case of the electrodes. The electrodes on the pyroelectric film may be integrated with the pyroelectric film, for example, through vapor deposition or adhesion or they may be only contacted to the latter.

The pyroelectric property of the pyroelectric film is not necessarily uniform over the entire surface but it is required for the pyroelectric element combined with spot electrodes that the pyroelectric property is at least uniform for each of the points of the electrode coordinate.

In addition, the chopper is used for giving temperature changes upon measurement since only the temperature changes can be measured by the pyroelectric element. But the chopper may be replaced with a shutter or may be omitted entirely by adapting ON-OFF design for the infrared source. Further, detection devices 12, 26, 27 may be adapted to detect electric current instead of voltage. In addition, materials for both pyroelectric layer and infrared fluorescent substance layer may be chosen according to their wavelength-dependent absorption characteristics.

What is claimed is:

1. An apparatus for detecting and visualizing infrared rays comprising an infrared detector which has pyroelectric element having a thin pyroelectric layer and a mechanism for visualizing infrared rays, said mechanism comprising an infrared-sensitive phosphor layer located on the same optical path of the infrared rays as that for the pyroelectric element, wherein one of either the pyroelectric element or the infrared-sensitive phosphor layer is capable of transmitting at least a part of the incident infrared rays therethrough, the other of the pyroelectric element or the infrared-sensitive phosphor layer receives the thus transmitted infrared rays.

2. The apparatus according to claim 1, in which the pyroelectric element has at least one pyroelectric layer and an electrode layer provided on each side of said pyroelectric layer.

3. The apparatus according to claim 2, in which one of the electrode layers for the pyroelectric element comprises a plurality of spot-like electrodes insulated from each other.

4. The apparatus according to claim 2, in which one of the electrode layers for the pyroelectric element comprises a first group of conductor bands insulated from each other.

5. The apparatus according to claim 4, in which said pyroelectric element has an additional pyroelectric layer, one face of said additional pyroelectric layer being located against the other of the electrode layers of said pyroelectric element, said additional pyroelectric layer having another electrode layer on the other face thereof, said another electrode layer comprising a second group of conductor bands insulated from each other and extending in the direction transverse to said first group of conductor bands.

6. The apparatus according to claim 2, in which a light chopper device is provided for intermittently passing the infrared rays to the pyroelectric element and the infrared-sensitive phosphor layer.

7. The apparatus according to any one of claims 1 to 6, in which the pyroelectric element is substantially transparent to the infrared rays, and the infrared-sensitive phosphor layer receives the infrared rays which have been transmitted through the pyroelectric element.

8. The apparatus according to claim 7, in which the pyroelectric layer is a film having pyroelectric polarity, a main ingredient of said film being selected from the group consisting of vinylidene fluoride polymer, vinyl fluoride polymer and a copolymer containing at least one of vinylidene fluoride and vinyl fluoride.

9. The apparatus according to any one of claims 1 to 6, in which the infrared-sensitive phosphor layer is integrally provided on one surface of the pyroelectric element.

10. A composite element for detecting and visualizing infrared rays, comprising a pyroelectric element having at least one pyroelectric layer and electrode layers provided on both surfaces of the pyroelectric layer and an infrared-sensitive phosphor layer integrally provided on one surface of the pyroelectric element, one of either the pyroelectric element or the infrared-sensitive phosphor layer being capable of transmitting at least a part of the incident infrared rays therethrough, the other of the pyroelectric element or the infrared-sensitive phosphor layer receiving the thus transmitted infrared rays.

11. The composite element according to claim 10, in which one of the electrode layers comprises a plurality of spot-like electrodes insulated from each other.

12. The composite element according to claim 10, in which one of the electrode layers comprises a first group of conductor bands insulated from each other.

13. The composite element as claimed in claim 12, in which said pyroelectric element has an additional pyroelectric layer, one face of said additional pyroelectric layer being located against the other of the electrode layers of said pyroelectric element, said additional pyroelectric layer having another electrode layer on the other face thereof, said another electrode layer comprising a second group of conductor bands insulated from each other and extending in the direction transverse to said first group of conductor bands.

14. The composite element according to any one of claims 10 to 13, in which the pyroelectric element is substantially transparent to the infrared rays, and the infrared-sensitive phosphor layer receives the infrared rays which have been transmitted through the pyroelectric element.

15. The composite element according to claim 14, in which the pyroelectric layer comprises a film having pyroelectric polarity, the main ingredient of said pyroelectric layer being selected from the group consisting of vinylidene fluoride polymer, vinyl fluoride polymer and copolymer containing at least one of vinylidene fluoride and vinyl fluoride.

* * * * *